United States Patent [19]

Cragun

[11] Patent Number: 5,511,187
[45] Date of Patent: Apr. 23, 1996

[54] METHOD AND SYSTEM FOR NONVISUAL GROUPWARE PARTICIPANT STATUS DETERMINATION IN A DATA PROCESSING SYSTEM

[75] Inventor: Brian J. Cragun, Rochester, Minn.

[73] Assignee: International Business Machines Corporation, Armonk, N.Y.

[21] Appl. No.: 994,806

[22] Filed: Dec. 22, 1992

[51] Int. Cl.6 .................................................. G06F 17/30
[52] U.S. Cl. .................... 395/600; 395/154; 364/DIG. 1; 364/284.3
[58] Field of Search ................................... 395/600, 425, 395/600, 154

[56] References Cited

U.S. PATENT DOCUMENTS

| | | | |
|---|---|---|---|
| 4,974,173 | 11/1990 | Stefik et al. | 395/153 |
| 5,186,629 | 2/1993 | Rohen | 434/114 |
| 5,220,657 | 6/1993 | Bly et al. | 395/425 |
| 5,223,828 | 6/1993 | McKiel, Jr. | 340/825.19 |
| 5,287,102 | 2/1994 | McKiel, Jr. | 340/825.19 |
| 5,412,774 | 5/1995 | Agrawal et al. | 395/157 |

OTHER PUBLICATIONS

"Self-Announcing List Box," C. Cavendish, F. McKiel, IBM Technical Disclosure Bulletin, vol. 34, No. 5, Oct., 1991, p. 348.
"Audible Cursor Positioning and Pixel Status Identification Mechanism,"A. D. Drumm, D. M. Gooding, IBM Technical Disclosure Bulletin, vol. 27, No. 4B, Sep., 1984, p. 2528.
"A System for Three-Dimensional Acoustic 'Visualization'in a Virtual Environment Workstation," E. M. Wenzel, S. S. Fisher, P. K. Stone, S. H. Foster, IEEE, 1990, pp. 329–337.
"Making the GUI Talk," R. S. Schwerdtfeger, BYTE Magazine, Dec., 1990.
"Hearing Graphics for the First Time," J. J. Lazzaro, BYTE Magazine, Dec., 1990.
"Chaotic Progress," J. J. Barron, BYTE Magazine, Dec. 1990.

Primary Examiner—Thomas G. Black
Assistant Examiner—Wayne Amsbury
Attorney, Agent, or Firm—Andrew J. Dillon

[57] ABSTRACT

A method and system are disclosed for permitting nonvisual determination of groupware participant status in a data processing system. In a data processing system in which multiple users are permitted to simultaneously utilize a selected application, a selected audible signal is associated with each user. A periodic determination is then made as to which users are currently utilizing a selected application and an associated audible signal for each such user is generated within the data processing system, permitting nonvisual determination of the presence of each user within the selected application. Additionally, the location of utilization within the application by each user and/or the level of activity of each user may be utilized to selectively alter the audible signal associated with a particular user, permitting a nonvisual determination of the status of any user within the application.

10 Claims, 5 Drawing Sheets

METHOD AND SYSTEM FOR NONVISUAL GROUPWARE PARTICIPANT STATUS DETERMINATION IN A DATA PROCESSING SYSTEM

BACKGROUND OF THE INVENTION

1. Technical Field

The present invention relates in general to an improved data processing system and in particular to an improved method and system for determining the status of users within a data processing system. Still more particularly, the present invention relates to an improved method and system for nonvisual determination of the status of users simultaneously utilizing a selected application within a data processing system.

2. Description of the Related Art

In recent years modern state-of-the-art data processing systems have become increasingly complex and the interface between users and such systems has undergone a concomitant increase in complexity. Graphical user interfaces now exist which permit users to interact with objects within the data processing system in a manner similar to the manner in which such objects are manipulated in the real world. For example, in order to file a document in a folder which is located within a file cabinet in the work place, a user will open the file cabinet, locate and open the correct folder, and then place the document inside. In the electronic work place of the graphical user interface, the user performs a similar process. Thus, a user will open the file cabinet icon, locate the correct folder icon, and then drop the document icon in the located folder. Because this is an electronic environment, users do not have to open the folder to put the document into it. However, users are thus able to utilize their knowledge of a real work place in order to perform this operation.

Another example of the manner in which modern data processing systems simulate the work place is the utilization of so-called "groupware." In a groupware environment, multiple users are simultaneously active within a single application. In this manner, as in the real world, several users may simultaneously utilize documents, spread sheets, databases and design systems. The flexibility with which multiple users may utilize a single application in such systems makes it necessary to provide coordination of the activities of these users. For example, it is desirable for a groupware participant to be able to determine how many other participants are active within an application, where those participants are working within an application and at what activity level those participants are engaged.

One technique by which users may be advised of activities within a data processing system involves the utilization of sound. This technology is frequently utilized by blind and visually impaired computer users and often includes speech synthesis and voice recognition. It has also been suggested that programmers could write software with built-in voice labels for icons. See Lazzaro, Windows of Vulnerability, Byte Magazine, June 1991, at page 416.

Various synthetic or recorded speech solutions for making computer display contents available to blind persons have also been suggested, for example in Golding et al., IBM Technical Disclosure Bulletin, Vol. 26, No. 10B, pages 5633–5636 (March 1984); and, Barnett et al., IBM Technical Disclosure Bulletin, Vol. 26, No. 10A, pages 4950–4951 (March 1984).

Additionally, there have been suggested systems which include a mouse with a braille transducer so that a blind mouse user may read text and obtain certain tactile position feedback from such a mouse. Comerford, IBM Technical Disclosure Bulletin No. 3, Vol. 28, page 1343 (August 1985); and Affinito, et al., IBM Technical Disclosure Bulletin No. 12, Vol. 31, page 386 (May 1989). However, while announcing various text items, either audibly or by means of a braille transducer in the mouse, such systems may provide some information to a blind user, they do not enable the user to navigate about and locate objects on the computer display screen.

There have been suggested an audible cursor positioning and pixel (picture element) status identification mechanism which may be utilized to help a user of an interactive computer graphics system locate data by utilizing aural feedback to enhance visual feedback. As the cursor in such a system is stepped across the screen, an audible click is generated which varies in tone corresponding in tone to the current status of each pixel encountered. With this combination in audible and visual cursor feedback, it becomes a simple task to identify the desired line by noting the change in tone as the cursor moves. For color display applications, each color is represented by a distinct tone so that any single pixel may be distinguished from surrounding pixels of a different color. It has been suggested that this system is especially helpful for visually impaired or learning disabled users. Drumm et al., IBM Technical Disclosure Bulletin No. 48, Vol. 27, page 25–28 (September 1984). However, the foregoing disclosure does not suggest a means of enabling a blind user to navigate about or locate objects on a computer display screen.

Recently, in U.S. patent application Ser. No. 07/746,838, issued as U.S. Pat. No. 5,223,828, filed Aug. 19, 1991, a system has been disclosed which permits a blind or visually impaired user to interact with a so-called "message box" within a graphical user interface. As those skilled in the art will appreciate, each message box consists of an icon, explanatory text, and one or more "push buttons." The icon allows the user to identify visually the type of message. The text typically explains the situation and may provide assistance. The textual content may be a question or a statement. Push buttons provided within a message box typically allow the user to interact with the message box.

The system described above permits blind or visually impaired users to accommodate a message box by announcing the textual contents of such a box when the message box first appears. Thereafter, the push buttons available to respond to the message box are also announced in order from left to right. A homing signal is then provided for finding the message box which increases in pitch as the mouse pointer approaches the message box. When the pointer enters the message box, the message box text and available push buttons are reannounced and the pointer is automatically moved to a default push button. By utilizing this system, a blind or visually impaired user may locate a message box within a computer display system; however, this system fails to provide any suggestion of a manner in which a blind or visually impaired user may selectively locate multiple displayed elements within a graphical user interface.

Another method and system have also been recently disclosed in U.S. patent application Ser. No. 07/746,480, issued as U.S. Pat. No. 5,160,031, filed Aug. 19, 1991, which permits a blind or visually impaired user to locate a mouse pointer or other graphical pointing device within the client area of a window within a graphical user interface by providing a stereo sound system and varying the intensity of the left and right audio channels to indicate a position of the mouse pointer. This system also proposes an increase in pitch of an associated sound to indicate the position of the pointer in the top or bottom of the client area of a window. While this system permits a blind or visually impaired user to manipulate a mouse pointer within a graphical user interface, it fails to show or suggest any technique whereby a particular one of a group of displayed graphical elements may be selected by such a user.

U.S. patent application Ser. No. 802,956, filed Dec. 5, 1991, discloses a method and system which enables a blind or visually impaired user to select a displayed graphic element within a computer system by associating an audible signal with each element within the display and thereafter generating a composite audio signal which includes elements of each audible signal associated with the displayed graphic element within a predetermined radius of the cursor.

While each of the aforementioned systems greatly enhances the ability of a blind, visually impaired or visually occupied user to interface with a data processing system, none of these systems permit a user to determine the status of other users within a groupware application wherein multiple users are simultaneously active within a single application. Those skilled in the art will appreciate that it would be desirable for a particular user to be able to efficiently determine the number of others users within a groupware application, the location of such users within the work place and the level of activity of such users within a groupware application.

SUMMARY OF THE INVENTION

It is therefore one object of the present invention to provide an improved data processing system.

It is another object of the present invention to provide an improved method and system for determining the status of users within a data processing system.

It is yet another object of the present invention to provide an improved method and system for nonvisual determination of the status of users simultaneously utilizing a selected application within a data processing system.

The foregoing objects are achieved as is now described. The method and system of the present invention permits nonvisual determination of groupware participant status in a data processing system. In a data processing system in which multiple users are permitted to simultaneously utilize a selected application, a selected audible signal is associated with each user. A periodic determination is then made as to which users are currently utilizing a selected application and an associated audible signal for each such user is generated within the data processing system, permitting nonvisual determination of the presence of each user within the selected application. Additionally, the location of utilization within the application by each user and/or the level of activity of each user may be utilized to selectively alter the audible signal associated with a particular user, permitting a nonvisual determination of the status of any user within the application.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
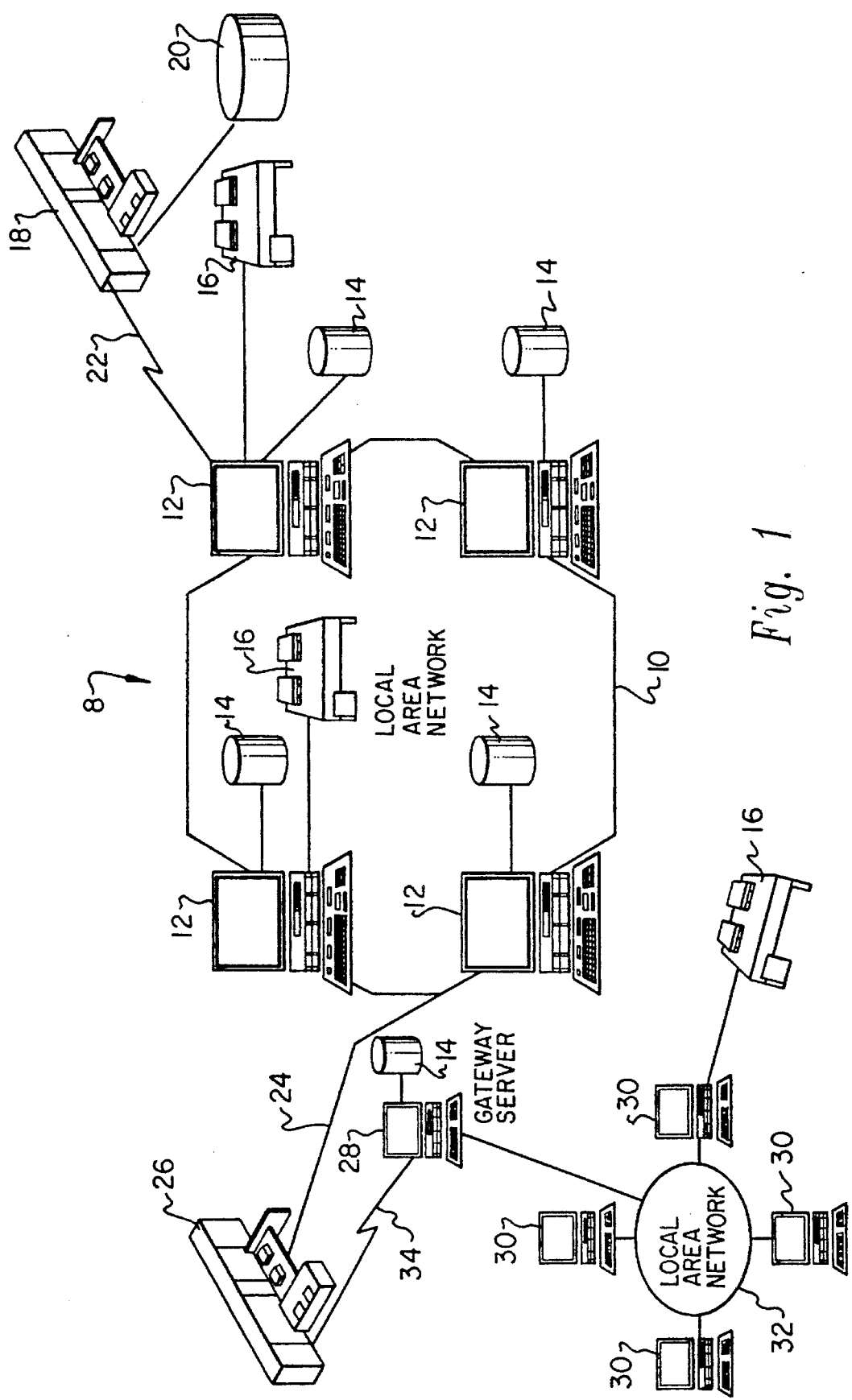
FIG. 1 depicts a pictorial illustration of a distributed data processing system which may be utilized to implement the method and system of the present invention.

With reference now to the figures and in particular with reference to FIG. 1, there is depicted a pictorial representation of a distributed data processing system 8 which may be utilized to implement the method and system of the present invention. As may be seen, distributed data processing system 8 may include a plurality of networks, such as Local Area Networks (LAN) 10 and 32, each of which preferably incudes a plurality of individual computers 12 and 30, respectively. Of course, those skilled in the art will appreciate that a plurality of Intelligent Work Stations (IWS) coupled to a host processor may also be utilized for each such network. Further, upon reference to the foregoing description those skilled in the art will appreciate that the method and system of the present invention may be implemented in a much less complex system. For example, two personal computers coupled together in a network may be utilized to implement the present invention.

As is common in such data processing systems, each individual computer may be coupled to a storage device 14 and/or a printer/output device 16. One or more such storage devices 14 may be utilized, in accordance with the method and system of the present invention, to store various "groupware" applications or documents which may be simultaneously accessed and processed by multiple users in accordance with the method and system of the present invention.

Still referring to FIG. 1, it may be seen that distributed data processing system 8 may also include multiple mainframe computers, such as mainframe computer 18, which may be coupled to Local Area Network (LAN) 10 by means of communications link 22. Mainframe computer 18 may be coupled to storage device 20 which may serve as a remote storage for Local Area Network (LAN) 10 and may be coupled via communications controller 26 and communications link 34 to a gateway server 28. Gateway server 28 is preferably an individual computer or Intelligent Work Station (IWS) which serves to link Local Area Network (LAN) 32 to Local Area Network (LAN) 10.

As discussed above with respect to Local Area Network (LAN) 32 and Local Area Network (LAN) 10, a plurality of data objects, groupware applications or documents may be stored within storage device 20 and controlled by mainframe computer 18, as Resource Manager or Library Server for the data objects and documents thus stored. Those skilled in the art will appreciate that is often desirable to permit simultaneous access to such data objects, groupware applications or documents by multiple users within distributed data processing system 8.

Additionally, those skilled in the art will appreciate that mainframe computer 18 may be located a great geographical distance from Local Area Network (LAN) 10 and similarly, Local Area Network (LAN) 10 may be located a substantial distance from Local Area Network (LAN) 32. That is, Local Area Network (LAN) 32 may be located in California, while Local Area Network (LAN) 10 may be located in Texas and mainframe computer 18 may be located in New York.

As will be appreciated upon reference to the foregoing, it is often permitted for multiple users within distributed data processing system 8 to access a particular data object, groupware application or document from multiple locations within distributed data processing system 8. However, as discussed above, access to such groupware applications or documents by multiple users may preferably be monitored utilizing the method and system of the present invention, such that selected users may efficiently determine the number of other users within the application, the location of such users within the application work space and/or the level of activity of such users within a groupware application. The method and system of the present invention may be implemented by programming one or more computers or terminals within data processing system 8 to implement the processes set forth herein within FIGS. 3–5.

Figure 2:
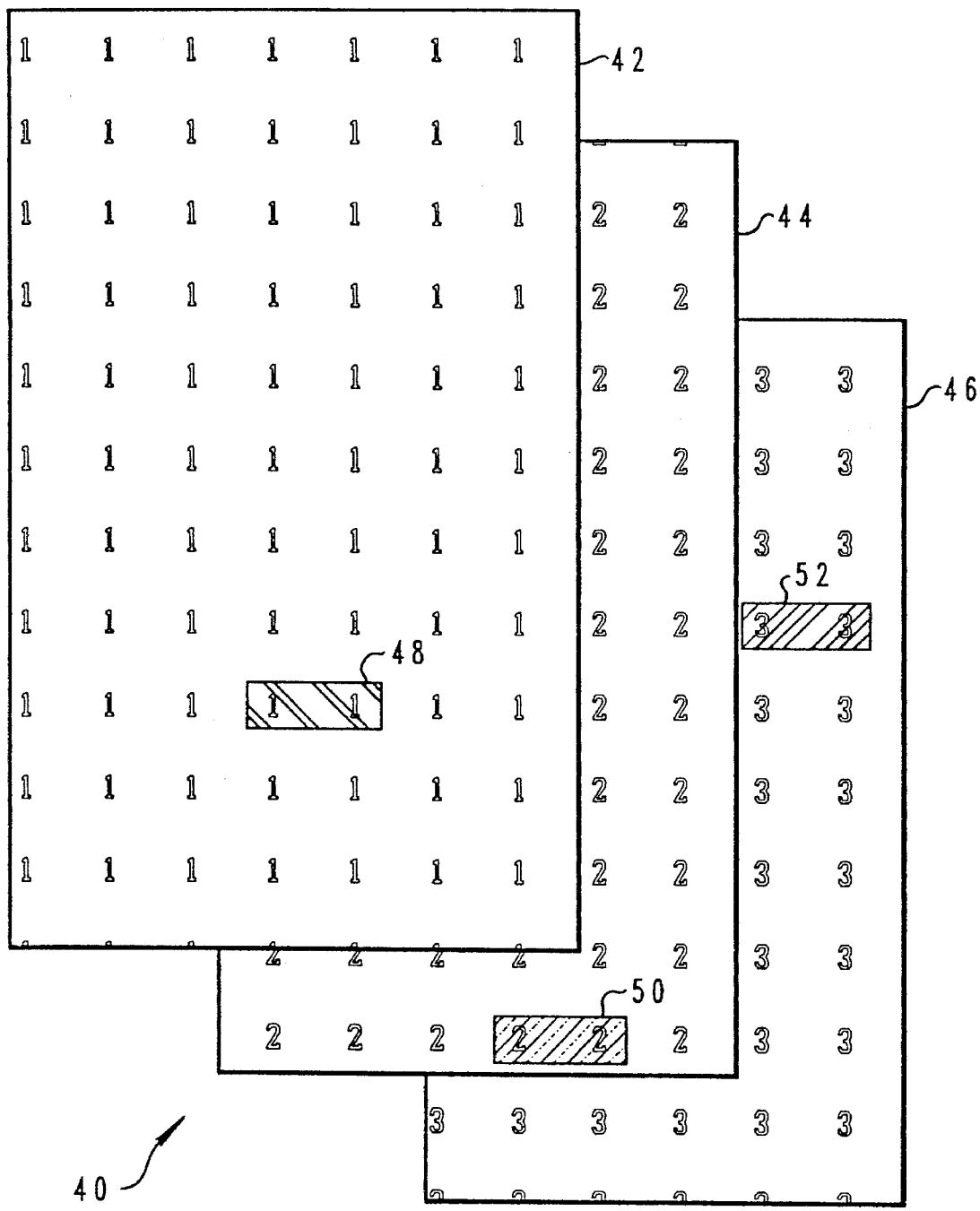
FIG. 2 illustrates a schematic representation of a groupware application which may be simultaneously utilized by multiple users in accordance with the method and system of the present invention.

Referring now to FIG. 2, there is depicted a schematic representation of a groupware application which may be simultaneously utilized by multiple users in accordance with the method and system of the present invention. As schematically illustrated, a groupware application 40 is depicted. Groupware application 40, in the depicted schematic embodiment of FIG. 2, preferably includes a first section 42, a second section 44 and a third section 46. Of course, those skilled in the art will appreciate that groupware application 40 may include a greater or lesser number of selections, as described. Each section of the groupware application thus depicted may be simultaneously accessed and utilized by a user within distributed data processing system 8 in a manner well known to those having skill in the art.

As illustrated within FIG. 2, a first user may be active within first section 42 of groupware application 40 at the point indicated within highlighted section 48. Similarly, a second user may be simultaneously active within groupware application 40 at the point indicated by highlighted section 50 within second section 44. Similarly, a third user may be active within highlighted section 52 of third section 46 of groupware application 40. Thus, as should be apparent to those having skill in the art upon reference to the foregoing, if each of the depicted sections of groupware application 40 represents a single display screen of data, the user active at highlighted section 48 will not normally be aware of the activities of the user at highlighted section 50 or the user at highlighted section 52. Additionally, it is possible that one user may be passively receiving or "browsing" within one section while a second user is editing within that section. in such situations it may not be apparent to the second user that the first user is "active" within the application. It should therefore be apparent that a need exists for a method and system whereby the presence and/or activity of other users within groupware application 40 may be efficiently determined by a user within groupware application 40.

In accordance with the method and system of the present invention, each user participant within groupware application 40 is assigned a particular audible signal which is associated with that user. The audible signal associated with each particular user may constitute a particular tone, or musical voice. For example, a first groupware participant may be assigned a "trumpet" voice, while a second groupware participant is assigned a "flute" voice, and the third groupware participant is assigned a "oboe" voice. Those skilled in the art will appreciate that this may be accomplished utilizing standard audio cards which permit multi-voiced MIDI control, such as the International Business Machines Corporation Audio Capture and Playback Adapter. Thereafter, as will be explained in greater detail herein, the presence of a particular user within groupware application 40 may be nonvisually determined by other users within that application by the generation of an audible signal associated with a particular user during those periods of time when the associated user is active within the groupware application. Of course, those skilled in the art will appreciate that the association between a particular audible signal and the identity of a selected user may be made without identifying the participant, permitting the method and system of the present invention to allow both identity-known and identity-unknown association of a particular user with an audible signal within groupware application 40.

Additionally, the location or activity level of a particular user within groupware application 40 may also be determined utilizing the audible signal described above. For example, the pitch or frequency of a particular audible signal may be varied in accordance with a location within groupware application 40. For example, first section 42 may be assigned a high pitch value while third section 46 of groupware application 40 may be assigned a low pitch value, with second section 44 utilizing a medium pitch value. Thereafter, each time a groupware participant enters groupware application 40 the particular audible signal associated with that user will be generated at a relative pitch which may be utilized to indicate the location of that user within groupware application 40. Additionally, an audible signal may be periodically generated each time a groupware participant strikes a key at a keyboard or utilizes a pointing device, such as a mouse, thereby indicating an activity level within groupware application 40. Thus, a large number of keystrokes or mouse inputs by a particular user may be utilized to indicate a high level of activity within groupware application 40, by the generation of a large number of notes of the selected audible signal.

Upon reference to the foregoing those skilled in the art will appreciate that other audible attributes may also be utilized to indicate activity by selected participants within groupware application 40. For example, the volume of an associated audible signal may be utilized to indicate nearness within the groupware application work space to a listening participant, or the force of the activity of a user within the groupware application. Stereophonic sound may also be utilized to show position within the groupware work space. Additionally, various other noises or sounds may also be utilized to generate indications of the activity or status of users within a groupware application. For example, a user having a "trumpet" voice associated with that user's activities may have his or her status within the groupware application indicated at low activity levels by the playing of Brahm's "Lullaby" utilizing a "trumpet" voice while high levels of activity may be indicated by utilizing the "trumpet" voice to generate Rossini's "William Tell Overture."

Figure 3:
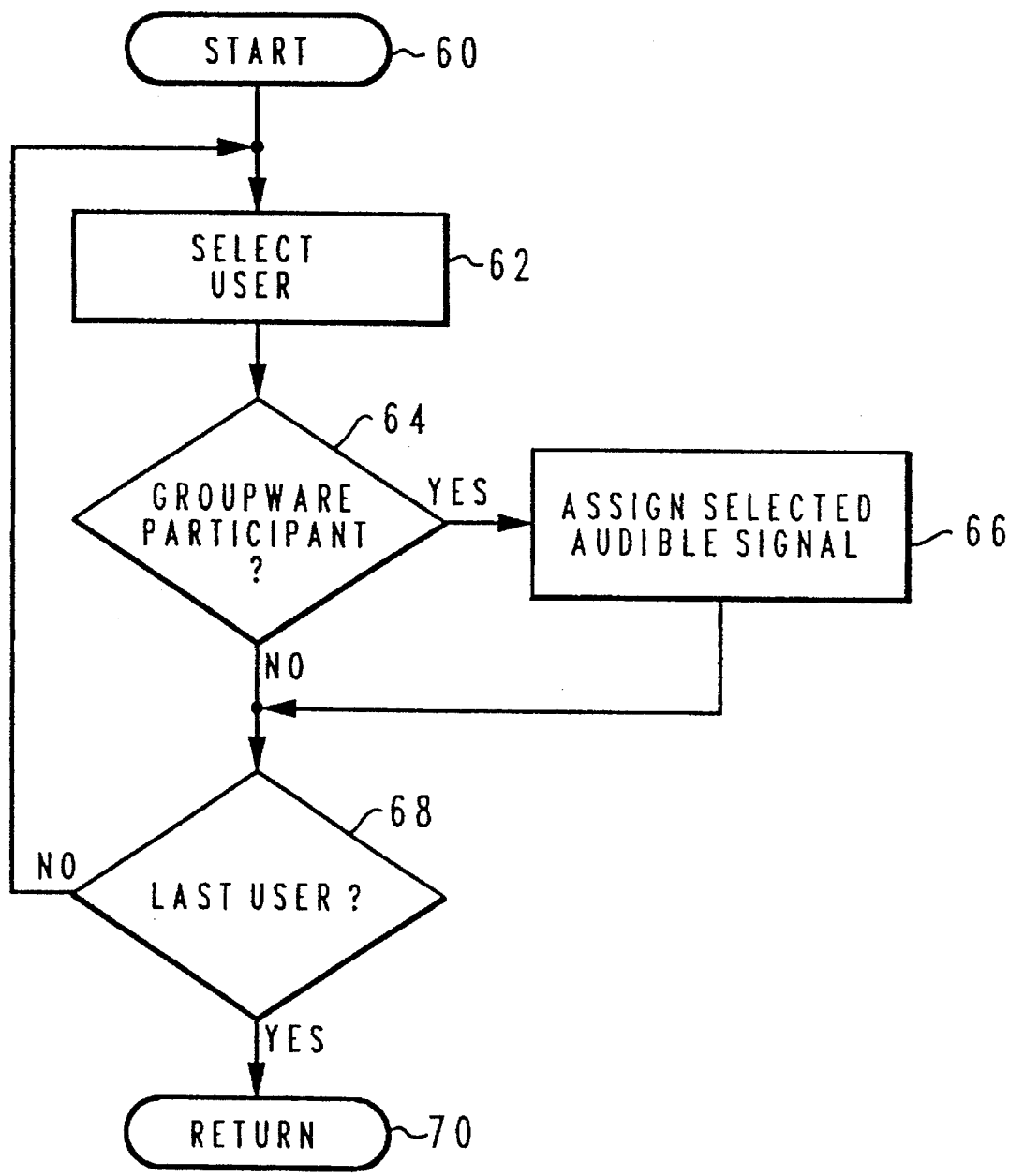
FIG. 3 is a high level logic flowchart which illustrates the association of a selected audible signal with a selected user in accordance with the method and system of the present invention.

With reference now to FIG. 3, there is depicted a high level logic flowchart which illustrates the association of a selected audible signal with a selected user in accordance with the method and system of the present invention. As depicted, this process beings at block 60 and thereafter passes to block 62. Block 62 illustrates the selection of a particular user for association with an audible signal. Thereafter, the process passes to block 64. Block 64 depicts a determination of whether or not the selected user is a groupware participant. If so, the process passes to block 66 which illustrates the assigning of a selected audible signal to that user.

Thereafter, or after determining that the selected user is not a groupware participant, the process passes to block 68. Block 68 illustrates a determination of whether or not the selected user is the last user within the group, and if not, the process returns iteratively to block 62 to once again begin the process of assigning a selected audible signal to each such user. After the last user has been selected, as determined at block 68, the process passes to block 70 and returns. Alternately, assignment of a selected audible signal may occur dynamically in response to a selection of a groupware application by a user.

Figure 4:
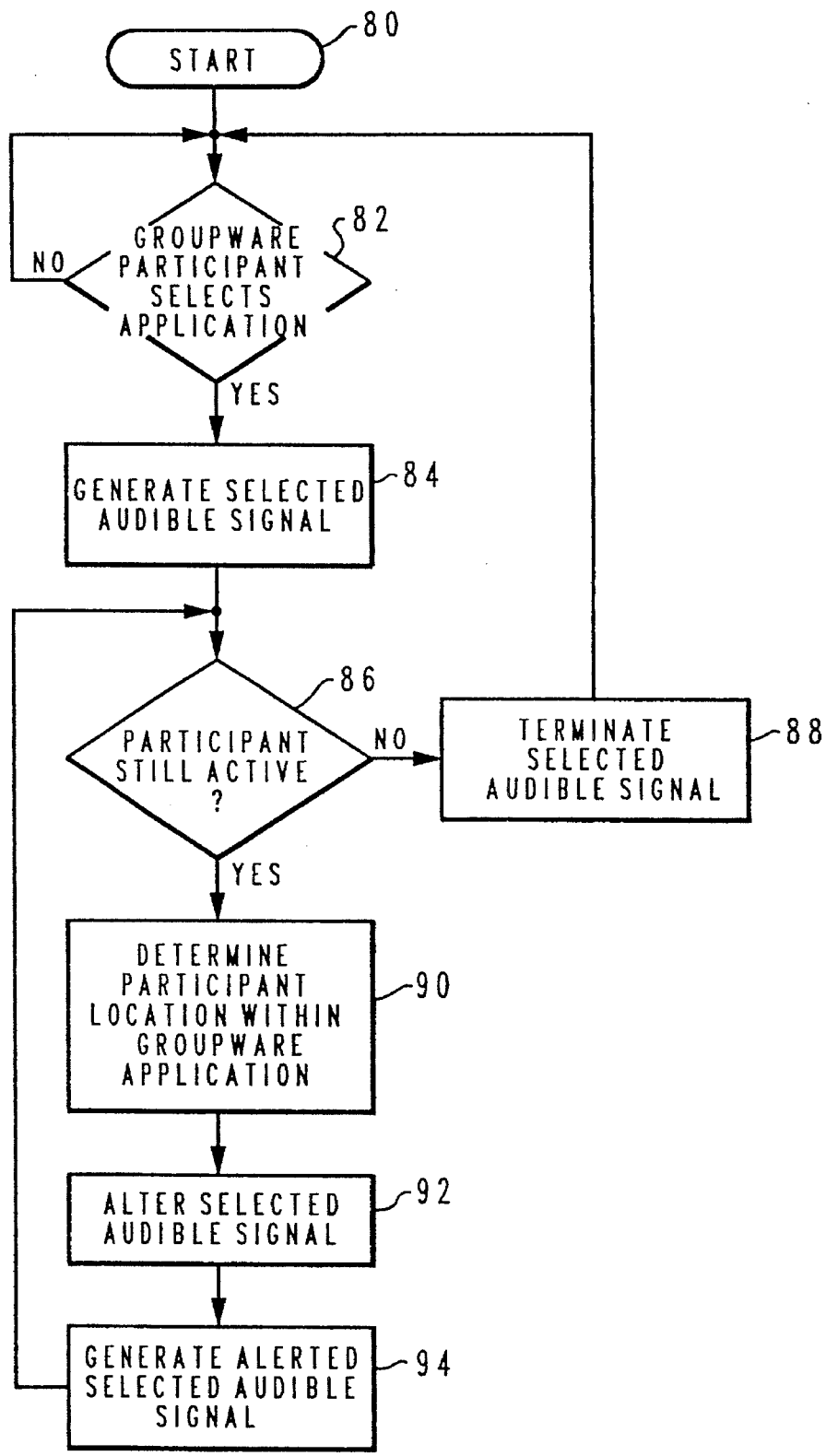
FIG. 4 is a high level logic flowchart which illustrates the nonvisual determination of a groupware participant's location within an application in accordance with the method and system of the present invention.

Referring now to FIG. 4, there is depicted a high level logic flowchart which illustrates the nonvisual determination of a groupware participant's location within an application, in accordance with the method and system of the present invention. As depicted, the process begins at block 80 and thereafter passes to block 82. Block 82 illustrates a determination of whether or not a groupware participant has selected a groupware application for utilization within the data processing system. If not, the process merely iterates until such time as a groupware participant does select a groupware application for utilization.

After a determination that a groupware participant has selected a groupware application for utilization, the process passes to block 84. Block 84 illustrates the generation of the selected audible signal associated with the particular user. Of course, those skilled in the art will appreciate that the selected audible signal may be generated continuously or periodically and still be utilized to provide a nonvisual indication of the status of a groupware participant within a data processing system. Thereafter, the process passes to block 86.

Block 86 illustrates a determination of whether or not the groupware participant is still active within the groupware application. If not, the process passes to block 88. Block 88 illustrates the termination of the selected audible cue and the process then returns to block 82 to once again await the selection of a groupware application by a groupware participant. However, in the event the groupware participant is still active within the selected groupware application, the process passes to block 90. Block 90 illustrates a determination of the participant location within the groupware application work space. As schematically illustrated within FIG. 2, a groupware application may comprise a textual document or spreadsheet which contains far more information than may be visually displayed within a data processing system. Thus, the textual document or spreadsheet may be thought of as including multiple pages of data and the location of a particular participant within the groupware application may thus be physically analogized to a determination of the page within the textual document or spreadsheet wherein the user is currently active. Thereafter, as depicted at block 92, the selected audible signal is altered to indicate the location of a particular groupware participant within the groupware application. As described above, this may be achieved simply by varying the frequency of the selected audible signal, or by any other suitable means.

Next, the process passes to block 94 which illustrates the generation of the altered selected audible signal, indicating to all other users within the groupware application the presence of the particular user associated with that selected audible signal and a relative location of that user within the groupware application work space. Thereafter, the process returns to block 86 to determine if the participant is still active within the groupware application and to continue to determine the location of the user within the groupware application, such that variations in location may be continuously monitored.

Figure 5:
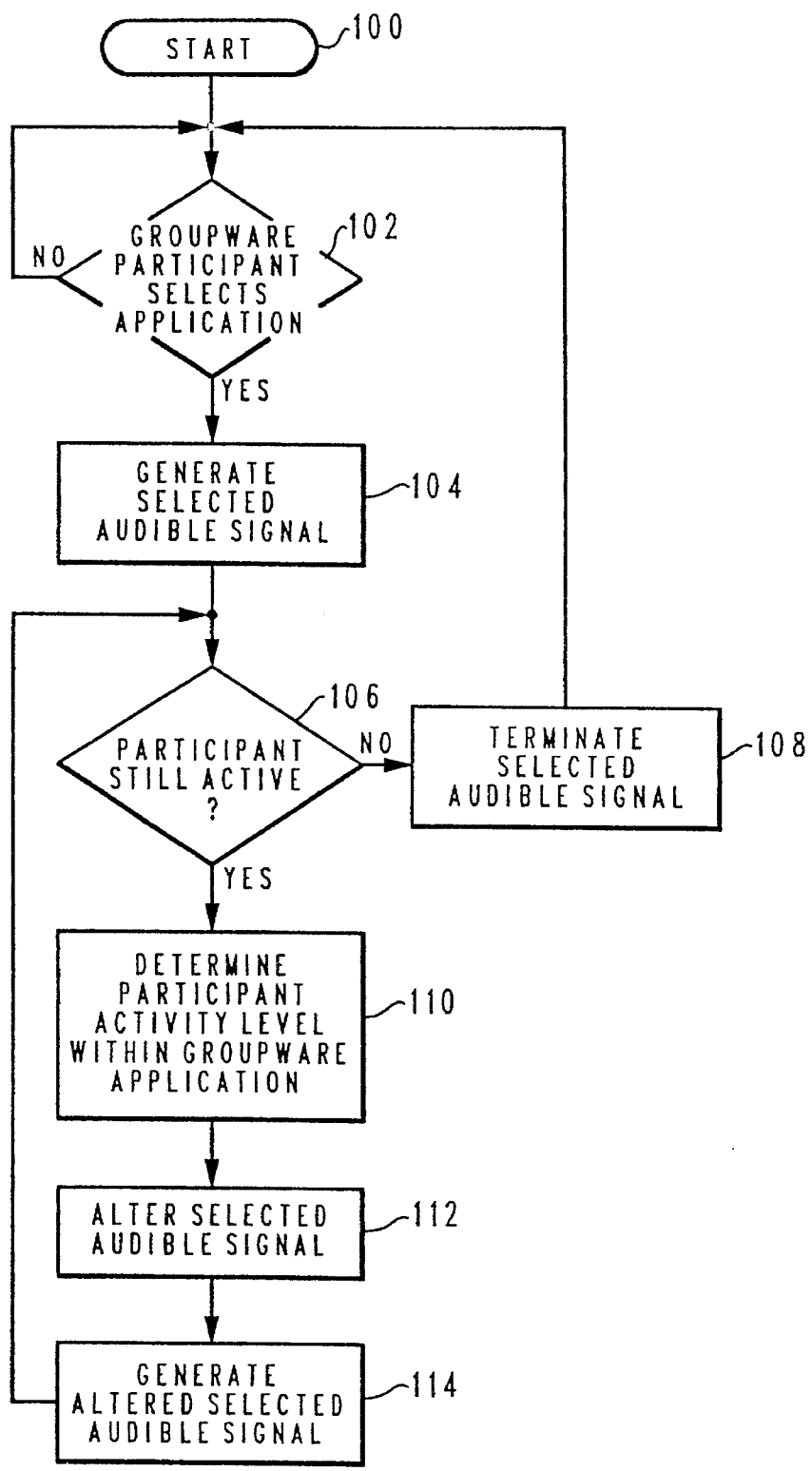
FIG. 5 is a high level logic flowchart which illustrates the nonvisual determination of a groupware participant's activity level within application in accordance with the method and system of the present invention.

With reference now to FIG. 5, there is depicted a high level logic flowchart which illustrates the nonvisual determination of a groupware participant's activity level within an application in accordance with the method and system of the present invention. As described with respect to FIG. 4, this process begins at block 100 and thereafter passes to block 102. Block 102 illustrates a determination of whether or not the groupware participant has selected a groupware application for utilization. As described above, if the groupware participant has not selected a groupware application for utilization the process merely iterates until such time as such selection occurs.

After a groupware participant has selected a groupware application for utilization, the process passes to block 104. Block 104 illustrates the generation of the selected audible signal which is associated with that user. Next, the process passes to block 106. As above, block 106 illustrates a determination of whether or not the participant is still active within the groupware application. If not, the process passes to block 108 which illustrates the termination of the selected audible signal and the process then returns, in an iterative fashion, to block 102 to await the selection of a groupware application by a groupware participant in the manner described above. Still referring to block 106, in the event the participant is still active within the groupware application, the process passes to block 110. Block 110 illustrates a determination of the participant's activity level within the groupware application. Thereafter, as depicted at block 112, the selected audible signal is altered to provide a nonvisual indication of the activity level of that user within the groupware application. As described above, the alteration of an audible signal to indicate activity level may be accomplished by repeating the audible signal or by a musical cue, or any other suitable technique.

After altering the selected audible signal to indicate the activity level of a groupware participant within a groupware application, the process passes to block 114. Block 114 illustrates the generation of the altered selected audible signal, indicating a relative level of activity by that user within the groupware application, and the process then returns to block 106, in an iterative fashion, to determine if the participant is still active within the groupware application and to continue to monitor the activity level of a groupware participant within the groupware application.

Upon reference to the foregoing those skilled in the art will appreciate that by associating a selected audible signal with each of a plurality of users within a data processing system the status of a particular user within a groupware application may be nonvisually determined by generating a selected audible signal associated with that user in response to a utilization of a groupware application by that user and by thereafter altering the selected audible signal in response to variations in the location of a user within the groupware application or the activity level of the user within the groupware application, the status of that user may be simply and efficiently determined.

While the invention has been particularly shown and described with reference to a preferred embodiment, it will be understood by those skilled in the art that various changes in form and detail may be made therein without departing from the spirit and scope of the invention.

I claim:

1. A method in a data processing system which permits simultaneous utilization of a selected application by a plurality of users for nonvisual determination of user status within said data processing system, said method comprising the steps of:

associating a selected audible signal with each of a plurality of users within said data processing system;

periodically determining which of said plurality of users within said data processing system are currently utilizing a selected application; and generating within said data processing system said selected audible signal associated with each of said plurality of users utilizing said selected application in response to said periodic determination wherein a user may nonvisually determine which of said plurality of users are currently utilizing said selected application.

2. The method in a data processing system for nonvisual determination of user status within said data processing system according to claim 1, further including the step of determining a location of utilization within said selected application for each of said plurality of users utilizing said selected application.

3. The method in a data processing system for nonvisual determination of user status within said data processing system according to claim 2, further including the step of altering said selected audible signal associated with each of said plurality of users utilizing said selected application in response to variations in said location of utilization within said selected application by each of said plurality of users utilizing said selected application.

4. The method in a data processing system for nonvisual determination of user status within said data processing system according to claim 1, further including the step of determining a level of activity within said selected application for each of said plurality of users utilizing said selected application.

5. The method in a data processing system for nonvisual determination of user status within said data processing system according to claim 4, further including the step of altering said selected audible signal associated with each of said plurality of users utilizing said selected application in response to variations in said level of activity within said selected application by each of said plurality of users utilizing said selected application.

6. A data processing system for nonvisual determination of user status within said data processing system, said data processing system permitting simultaneous utilization of a selected application by a plurality of users, said data processing system comprising:

means for associating a selected audible signal with each of a plurality of users within said data processing system;

means for periodically determining which of said plurality of users within said data processing system are currently utilizing a selected application; and means for generating within said data processing system said selected audible signal associated with each of said plurality of users utilizing said selected application in response to said periodic determination wherein a user may nonvisually determine which of said plurality of users are currently utilizing said selected application.

7. The data processing system for nonvisual determination of user status within said data processing system according to claim 6, further including means for determining a location of utilization within said selected application for each of said plurality of users utilizing said selected application.

8. The data processing system for nonvisual determination of user status within said data processing system according to claim 7, further including means for altering said selected audible signal associated with each of said plurality of users utilizing said selected application in response to variations in said location of utilization within said selected application by each of said plurality of users utilizing said selected application.

9. The data processing system for nonvisual determination of user status within said data processing system according to claim 6, further including means for determining a level of activity within said selected application for each of said plurality of users utilizing said selected application.

10. The data processing system for nonvisual determination of user status within said data processing system according to claim 9, further including means for altering said selected audible signal associated with each of said plurality of users utilizing said selected application in response to variations in said level of activity within said selected application by each of said plurality of users utilizing said selected application.

* * * * *